Nov. 13, 1928.                                                1,691,632
                        G. A. BARTOW
                           LEVEL
                    Filed Dec. 13, 1927           2 Sheets-Sheet 1
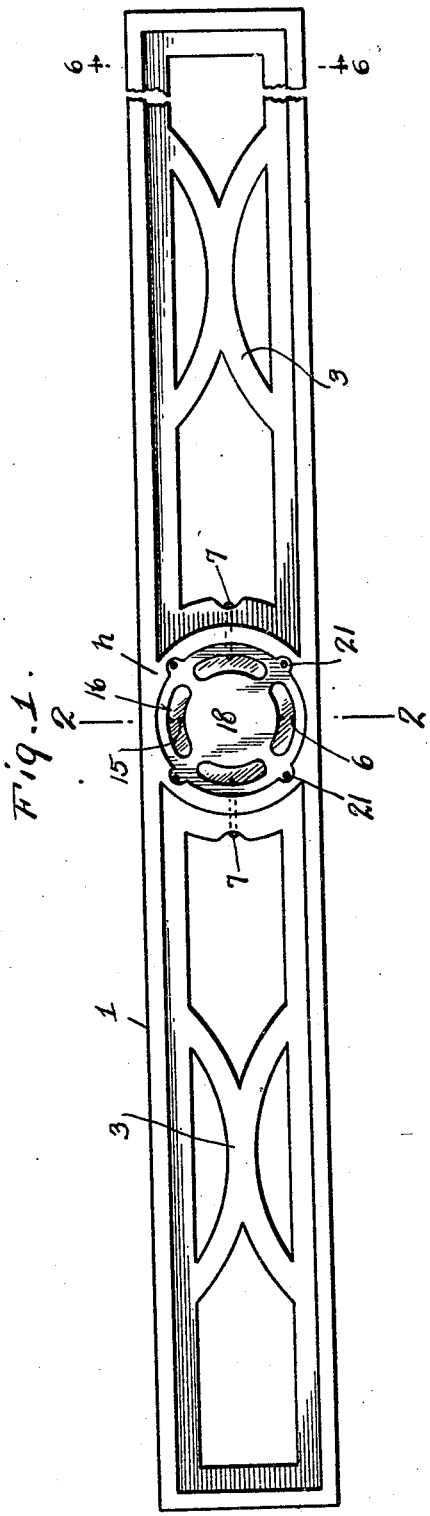
Inventor
George A. Bartow
By *Clarence A. O'Brien*
                                    Attorney Nov. 13, 1928.
G. A. BARTOW
LEVEL
Filed Dec. 13, 1927
1,691,632
2 Sheets-Sheet 2
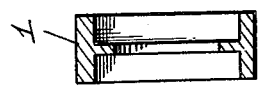
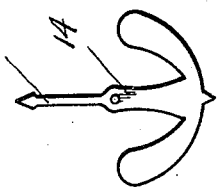
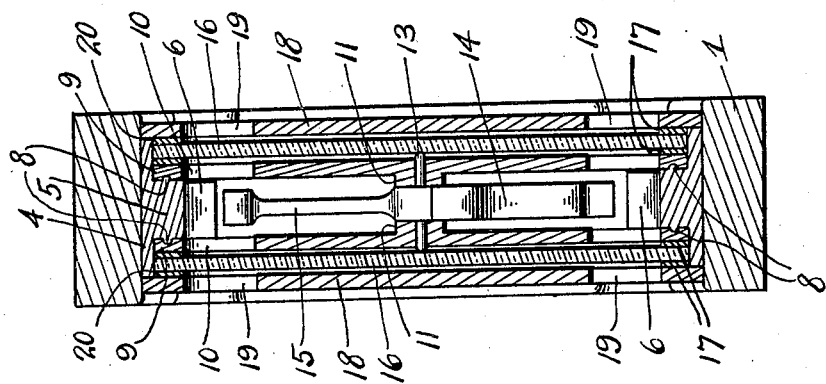
Inventor
George A. Bartow
By Clarence A.O'Brien
Attorney Patented Nov. 13, 1928.

1,691,632

UNITED STATES PATENT OFFICE.

GEORGE A. BARTOW, OF FLUSHING, NEW YORK.

LEVEL.

Application filed December 13, 1927. Serial No. 239,685.

This invention relates to improvements in levels, and aims to provide a novel level construction wherein instead of employing the usual liquid spirit glass, I provide a novel pendulum as a more advantageous substitute for the spirit glass.

I am aware that pendulums have been employed heretofore in this capacity, but in my present invention, improved means for mounting the pendulum as well as novelty in the construction of the pendulum exist.

The main object of my invention is to provide such a pendulum level wherein the various parts are simple in construction yet associated with each other in a manner whereby the level will be durable in use.

Another object resides in the particular manner in which the various component parts are associated so that any liability that the same will become wobbly or otherwise loose is thoroughly averted.

Still another object resides in the construction of the level body, wherein the same is preferably constructed of light metal.

Other very novel objects and advantages will become apparent as the invention is better understood from the specification and claim to follow.

In the drawing:—

Figure 1 is a side elevation of my improved level.

Fig. 2 is a cross sectional view through the pendulum portion of the level, taken substantially on the line 2—2 of Fig. 1.

Fig. 3 is a side elevation of the ring in which the pendulum of my level is mounted.

Fig. 4 is a sectional view through the ring.

Fig. 5 is a sectional view through one of the plates to which the pendulum is journaled.

Fig. 6 is a cross sectional view of the level body, taken substantially on the line 6—6 of Figure 1 and looking in the direction of the arrow, and Fig. 7 is a side elevation of the pendulum.

Now for a more detailed description of my invention, I refer to the drawings in which like numerals designate like parts. The body portion of the level includes the usual shaped level body. However, the same is preferably constructed of a light metal, such as aluminum or the like. The same includes a rectangular frame 1, at the intermediate portion of which a solid formation 2 is provided having a circular opening therethrough.

The frame is provided with the webbing 3 for further strengthening the same. Disposed within the circular opening of the intermediate solid portion 2 of the level, is a ring 4, provided with a rib 5 on its interior surface. The rib is formed at 90° intervals with pointer members 6. One pair of opposed pointers is adapted to be positioned in a plane in right angular relation to the longitudinal extent of the level body.

This ring is adapted to be maintained in the foregoing position by set screws 7 threaded through the solid portion of the level, and penetrating into the ring.

The rib 5 is provided with upper and lower projecting pin members 8 on opposite sides thereof. These pin projections are adapted to engage into recesses, registering therewith, in a pair of discular plates 9—9, for maintaining said plates against circumferential movement when against opposite sides of the rib 5.

Inwardly from the periphery of the discular plates are formed arcuate shaped openings 10. Centrally and at the inner side of each of said discular plates is a boss member 11.

Journaled within the bosses are the respective end portions of a pintle 13. Swingable with the pintel is a pendulum 14 provided with an upstanding indicating arm 15. The weighted portion of the pendulum is preferably semi-circular and is shown clearly in Fig. 7 of the drawing. Transparent disks 16 are separated from the respective discular plates 9 by gasket rings 17. Discular cover plates 18 are provided, each of which is adapted to have its periphery engage the wall of the circular opening in the solid body 2, while its inner surface adjacent its periphery abuts the edge of the ring 4.

The respective cover plates are resiliently spaced from the transparent disks 16, by additional packing rings 20. Each cover plate is formed with arcuate openings in registry with the openings 10 in a discular plate 9. Ear members 21 are provided at spaced intervals on the periphery of each cover plate. Suitable securing means are associated with the respective ear members for securing the cover plates to opposite sides of the level body.

It will thus be seen that I have provided a novel pendulum level, wherein the various parts are so related, that they will be firmly maintained in place against wobbling, and as a result of this particular favorable arrangement of parts, the device will be durable in use.

Having thus described my invention, what I claim as new is:—

A level comprising, a frame having the intermediate portion thereof solid and formed with a circular opening therethrough, a ring disposed within said opening, a pair of discular plates having central openings therein and oppositely disposed within said ring, a pendulum adapted to swing between the plates and having its pivot mounted in the plate openings, means for securing said plates in position, said means including a pair of cover plates which are respectively secured to the opposite extremities of the circular opening in the frame, and resilient means between each cover plate and adjacent circular disk for maintaining the latter in secured position.

In testimony whereof I affix my signature.

GEORGE A. BARTOW.